D. E. CROUCH.
CHAIN SAW.
APPLICATION FILED APR. 27, 1909. RENEWED JULY 19, 1911.
1,004,245.
Patented Sept. 26, 1911.
2 SHEETS—SHEET 2.
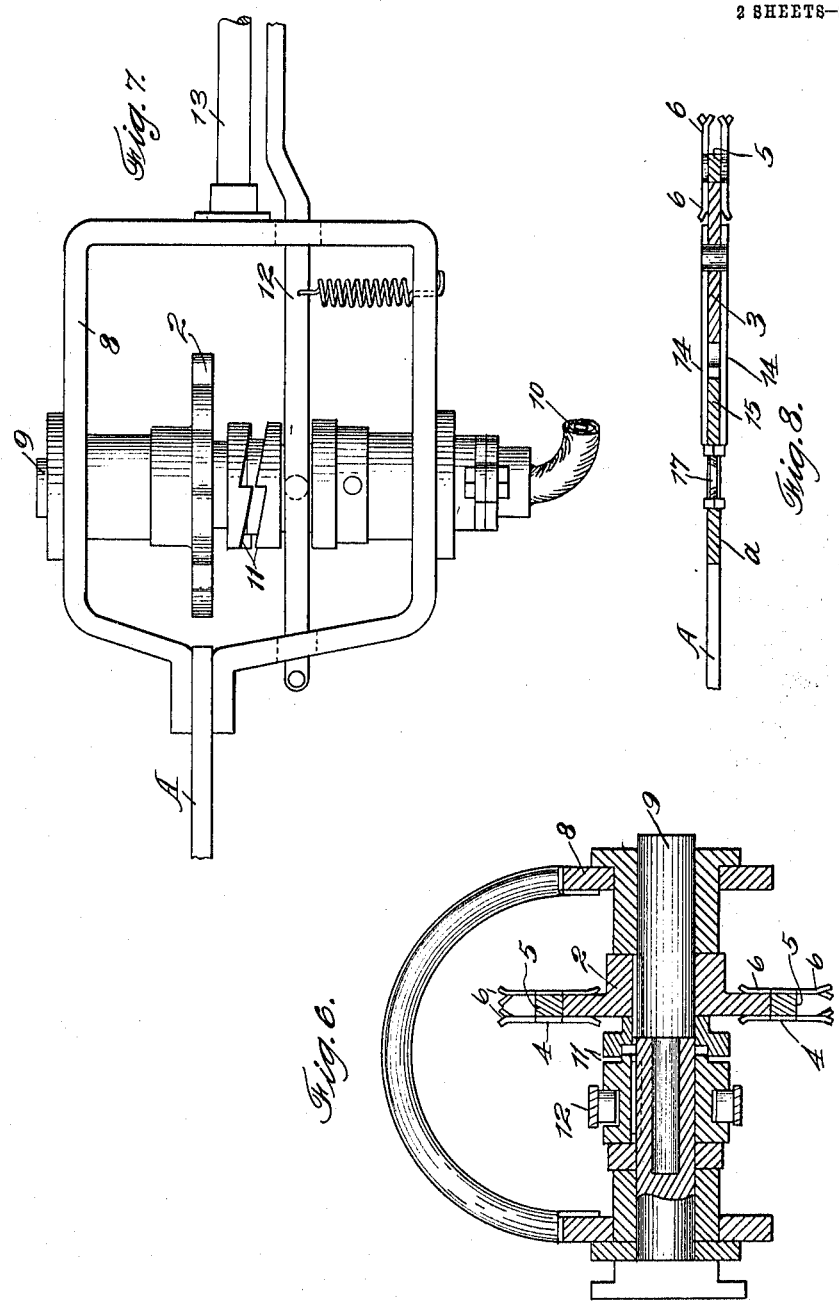
Witnesses;
F. E. Maynard.
C. A. Penfield.
Inventor:
Daniel E. Crouch;
By Geo. H. Strong
his Atty

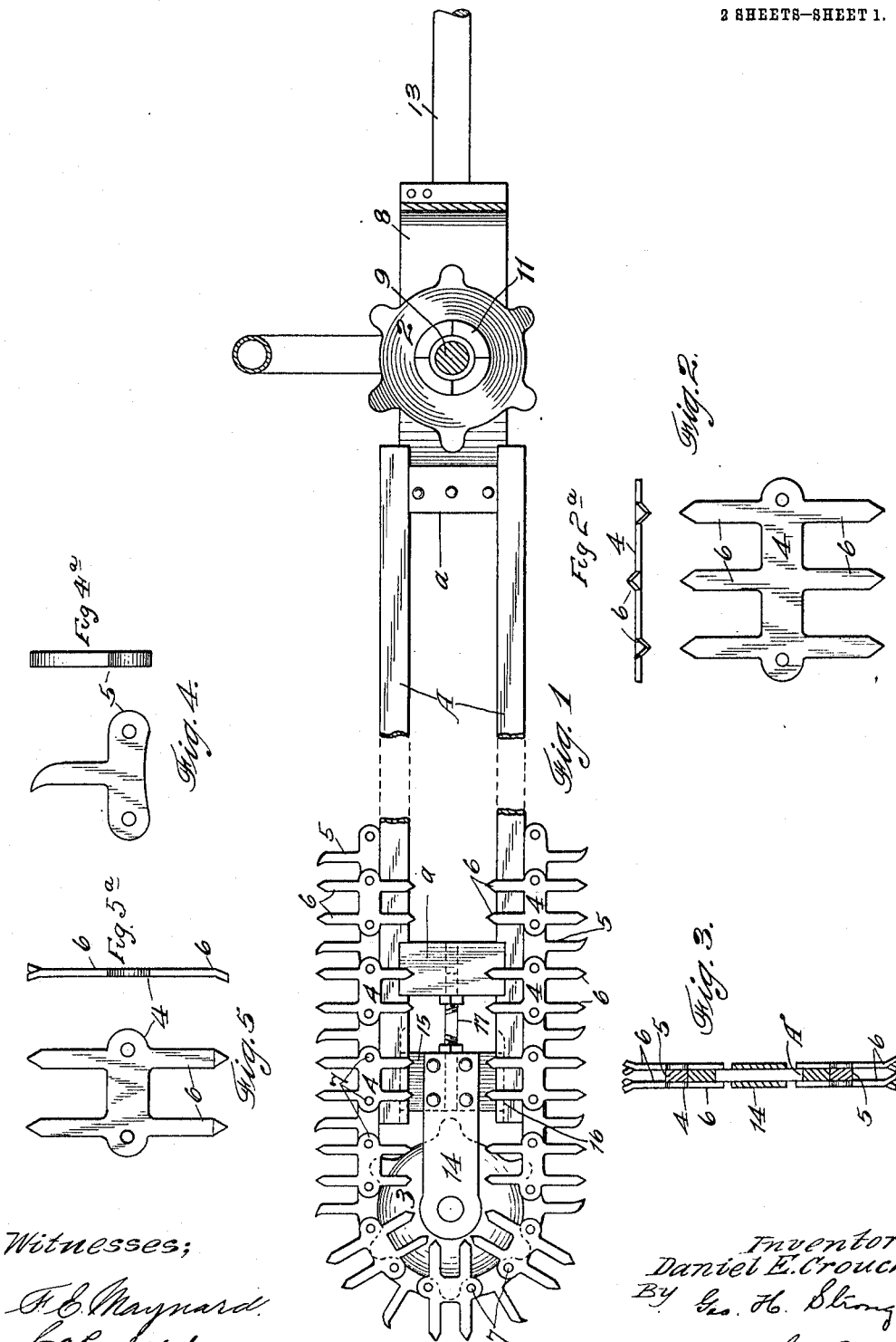

UNITED STATES PATENT OFFICE.

DANIEL E. CROUCH, OF OAKLAND, CALIFORNIA.

CHAIN-SAW.

1,004,245.  Specification of Letters Patent.  Patented Sept. 26, 1911.

Application filed April 27, 1909, Serial No. 492,459. Renewed July 19, 1911. Serial No. 639,470.

*To all whom it may concern:*

Be it known that I, DANIEL E. CROUCH, citizen of the United States, residing at Oakland, in the county of Alameda and State of California, have invented new and useful Improvements in Chain-Saws, of which the following is a specification.

My invention relates to chain-saws. Its object is to provide a light, strong, portable, handy, efficient and practical saw of the chain type for working in the woods and elsewhere, capable of sawing a log or block, if necessary, which is of greater diameter than the length of the saw; which saw will not bind, because the saw can cut its way clear; and in which saw the teeth are made double-ended and interchangeable, and four cutting edges are presented to the log, and the saw will be capable of being extricated from the kerf or cut by simply being drawn out of the kerf without having to lift it therethrough, or wedge the sawed ends of the log so as to permit the saw being withdrawn upward, as is usual.

One of the main features of this invention is the use of double-ended teeth; all as will be more fully hereinafter pointed out.

The invention consists of the parts and the construction and combination of parts as hereinafter more fully described and claimed, having reference to the accompanying drawings, in which—

Figure 1 is a side elevation, partly broken away. Fig. 2 is a detail of a tooth section. Fig. 2ª is an edge view of Fig. 2. Fig. 3 is a cross-section through the saw. Fig. 4 shows the raker tooth. Fig. 4ª is an edge view of Fig. 4. Fig. 5 shows a modified form of chain section. Fig. 5ª is an edge view of Fig. 5. Fig. 6 is a central section through the driving mechanism. Fig. 7 is a plan view of the driving mechanism. Fig. 8 is a horizontal section at the outer end of the saw.

A is a rectangular saw blade frame, which is here shown as comprising upper and lower spaced parallel thin bars suitably braced and connected near the ends by the thin brace plates *a*. Suitably mounted at the back and outer ends of the frame A are the thin sprockets 2—3 around which the chain-saw itself is adapted to pass. This endless chain is made up of the saw tooth sections 4 and alternating raker teeth 5. The saw tooth sections are double-ended to present the opposing complementary teeth 6, and there may be one or more teeth on each side of a section. These sections are arranged in pairs, side by side, straddling the guide bars of the saw frame A, and the ends of a pair of these sections 4 are pivoted to the end of intermediately positioned raker teeth 5 by the pins 7. The raker teeth 5 are of a thickness approximately that of the saw frame A, and the back of the raker teeth 5 rides on the sides of the frame and supports the chain thereon, while one set of the teeth 6 of sections 4 slides along the outside of the frame and forms guides to keep the chain in the proper plane with the frame.

To one end of the frame A is secured a suitable frame 8, in which is journaled a shaft 9 carrying a sprocket 2 arranged in the plane of the frame, and around which sprocket the chain passes; the teeth of the sprocket engaging in the interstices between the pairs of tooth sections 4 and the adjacent ends of the succeeding raker teeth 5. A suitable flexible shaft 10 connected with any appropriate source of power is coupled to the shaft 9, and the shaft 9 and saw will be driven in unison whenever the clutches 11 are in engagement. The clutches are worked by suitable mechanism, as the clutch lever 12 which extends out alongside the handle 13 by which the operator holds the saw when working.

The opposite end of the frame is so fashioned that that end of the saw may be drawn lengthwise out through the cut made by the saw, without having to lift the saw up through the top of the cut. This result is accomplished by fashioning the outer end of the frame so that it is open and allows the thin front outer sprocket 3 to be mounted and occupy a space just equal to the thickness of the frame. The sprocket 3 is mounted in a yoke 14 comprising two thin plates which are approximately of the thickness of the teeth sections 6, Fig. 3, these plates being connected at the back to a cross-head 15 which is slidable in suitable slots 16 in the opposed adjacent inner edges of the side bars of the frame. A suitable tightening device, such as the right and left threaded screw 17 having suitable lock nuts, permits the adjustment of the yoke 14 to accomplish the proper adjustment and tensioning of the chain. Thus it will be seen that the front sprocket 3 and its yoke 14 are no thicker than the total thickness of the chain-saw, so that you do not have to take the saw out through the top of the cut; but the saw may be pulled out of the cut when the bottom of the cut is reached. This is advantageous, because if the log should pinch, there is no necessity of using wedges.

One of the main features of the invention is the use of the double-ended teeth 6, by which the saw constantly presents four cutting edges to the log while in operation; two going, and two coming. This multiplicity of cutting edges allows the saw always to cut itself clear. The raker teeth clear the cut made by the saw teeth. By this peculiar construction of having the sides of the saw flush from the handle end forward, it enables a saw which may be only six feet long to cut through a log twelve feet in diameter, by cutting through the log on one side and then on the other.

Having thus described my invention, what I claim and desire to secure by Letters Patent is—

1. The combination with a frame comprising top and bottom runner bars, of an endless chain saw guided on said bars, said chain saw composed of saw sections having alined teeth upon opposite sides of the section pointing oppositely and with the teeth upon one side straddling said bars.

2. In a chain saw, the combination with a frame composed of top and bottom runner bars, of a chain saw guided on said bars and composed of sections having alined teeth upon opposite sides of the sections pointing oppositely, the longer axis of each tooth being arranged at right angles to the line of travel of the saw, and the teeth on the inner edge of the sections straddling said runner bars.

3. In a chain saw, the combination of a frame including top and bottom runner bars, of a chain saw composed of jointed sections, each of said sections including a body portion and alined teeth upon opposite sides thereof pointing in opposite directions and in a plane at right angles to the direction of travel of the saw.

4. In a chain saw, the combination of a frame including top and bottom runner bars, and a chain saw formed of jointed sections, each section including a body portion with alined teeth upon opposite edges pointing oppositely, said sections being reversible.

5. In a chain saw, the combination of a guiding frame and a chain saw formed of jointed sections each having a body portion with teeth projecting from opposite sides, said frame and saw teeth lying in the same plane, whereby the saw may be drawn endwise out through the cut and means for moving the saw.

6. In a chain-saw, the combination of a frame comprised of top and bottom runner bars, sprockets at the ends of the frame, said sprockets of approximately the same thickness as the frame, a chain-saw passing around the sprockets and guided on the runner bars, said chain composed of saw sections having double-ended teeth straddling the runner bars, said sections connected by raker teeth riding on the runner bars and of approximately the same thickness, a handle at one end of the frame, and flexible drive connections connected with the adjacent sprocket.

In testimony whereof I have hereunto set my hand in presence of two subscribing witnesses.

DANIEL E. CROUCH.

Witnesses:
J. W. McMANNIS,
W. R. SIBBETT.